(12) United States Patent
Rogers et al.

(10) Patent No.: US 10,996,914 B2
(45) Date of Patent: May 4, 2021

(54) PERSISTENT GEO-LOCATED AUGMENTED REALITY SOCIAL NETWORK SYSTEM AND METHOD

(71) Applicants: Anthony Rogers, Sunnyvale, CA (US); Christopher Oliver, Glendora, CA (US)

(72) Inventors: Anthony Rogers, Sunnyvale, CA (US); Christopher Oliver, Glendora, CA (US)

( * ) Notice: Subject to any disclaimer, the term of this patent is extended or adjusted under 35 U.S.C. 154(b) by 0 days.

(21) Appl. No.: 16/157,058

(22) Filed: Oct. 10, 2018

(65) Prior Publication Data

US 2019/0138260 A1    May 9, 2019

Related U.S. Application Data

(60) Provisional application No. 62/570,214, filed on Oct. 10, 2017.

(51) Int. Cl.
*G06T 19/00* (2011.01)
*G06F 3/14* (2006.01)
*G06F 3/147* (2006.01)

(52) U.S. Cl.
CPC ............ *G06F 3/1454* (2013.01); *G06F 3/147* (2013.01); *G06T 19/006* (2013.01); *G09G 2356/00* (2013.01)

(58) Field of Classification Search
None
See application file for complete search history.

(56) References Cited

U.S. PATENT DOCUMENTS

| | | | | |
|---|---|---|---|---|
| 2011/0221771 A1* | 9/2011 | Cramer | ................ | G06Q 30/02 345/633 |
| 2013/0278631 A1* | 10/2013 | Border | ................ | G06F 3/04842 345/633 |
| 2013/0335445 A1* | 12/2013 | Bala | ................ | G06F 3/147 345/633 |
| 2014/0237578 A1* | 8/2014 | Bryant | ................ | G06T 11/60 726/7 |
| 2016/0132318 A1* | 5/2016 | Hu | ................ | G06F 8/65 717/172 |
| 2016/0378887 A1* | 12/2016 | Maldonado | ......... | G06F 17/5004 705/26.81 |
| 2017/0076499 A1* | 3/2017 | Jiang | ................ | G11B 27/031 |
| 2017/0243403 A1* | 8/2017 | Daniels | ................ | G06F 3/147 |
| 2017/0337745 A1* | 11/2017 | Martin | ................ | G01S 19/14 |
| 2018/0024362 A1* | 1/2018 | Williamson | ............ | G01S 5/10 345/428 |
| 2018/0036640 A1* | 2/2018 | Drakoln | ................ | A63F 13/65 |
| 2018/0374267 A1* | 12/2018 | Yurkin | ................ | G06T 11/60 |

* cited by examiner

*Primary Examiner* — David H Chu

(57) ABSTRACT

A computerized process useful for sharing a persistent augmented reality (AR) objects between a set of users in a persistent AR system, comprising: implementing a persistent AR system, wherein the persistent AR system the set of users to place a set of persistent AR objects that are persistently viewable in an associated real-world context via a mobile device, wherein the persistent AR objects are shareable between users of the persistent AR system, and wherein the persistent AR objects are geolocated with the associated real-world context location; providing a list of each geolocated persistent AR object created by a first user as a user channel in the persistent AR system; enabling another user to subscribe to the channel; and enabling the other user to view each geolocated persistent AR object of the channel.

3 Claims, 24 Drawing Sheets

PERSISTENT GEO-LOCATED AUGMENTED REALITY SOCIAL NETWORK SYSTEM AND METHOD

CLAIM OF PRIORITY AND INCORPORATION BY REFERENCE

This application claims priority from U.S. Provisional Application No. 62/570,214, title PERSISTENT GEO-LOCATED AUGMENTED REALITY SOCIAL NETWORK SYSTEM AND METHOD and filed 10 Oct. 2017. This application is hereby incorporated by reference in its entirety for all purposes.

FIELD OF THE INVENTION

The invention is in the field of Augmented reality (AR) and more specifically to a method, system and apparatus of persistent geo-located augmented reality social network.

DESCRIPTION OF THE RELATED ART

Augmented reality (AR) is increasing popular and available to users via ubiquitous mobile devices (e.g. phone or tablet, or users of other suitable hardware such as AR enabled glasses with GPS capability). AR brings components of the digital world into a person's perception of the real world. AR displays can integrate multimedia elements and provide immersive sensations that are perceived as natural parts of an environment. Users may wish to create AR objects and share them with others is specific real-world locations. Accordingly, improvements to AR software system that enables mobile device users to place virtual objects persistently in the real world and share said virtual objects are desired.

SUMMARY

A computerized process useful for sharing a persistent augmented reality (AR) objects between a set of users in a persistent AR system, comprising: implementing a persistent AR system, wherein the persistent AR system the set of users to place a set of persistent AR objects that are persistently viewable in an associated real-world context via a mobile device, wherein the persistent AR objects are shareable between users of the persistent AR system, and wherein the persistent AR objects are geolocated with the associated real-world context location; providing a list of each geolocated persistent AR object created by a first user as a user channel in the persistent AR system; enabling another user to subscribe to the channel; and enabling the other user to view each geolocated persistent AR object of the channel.

Figure 1:
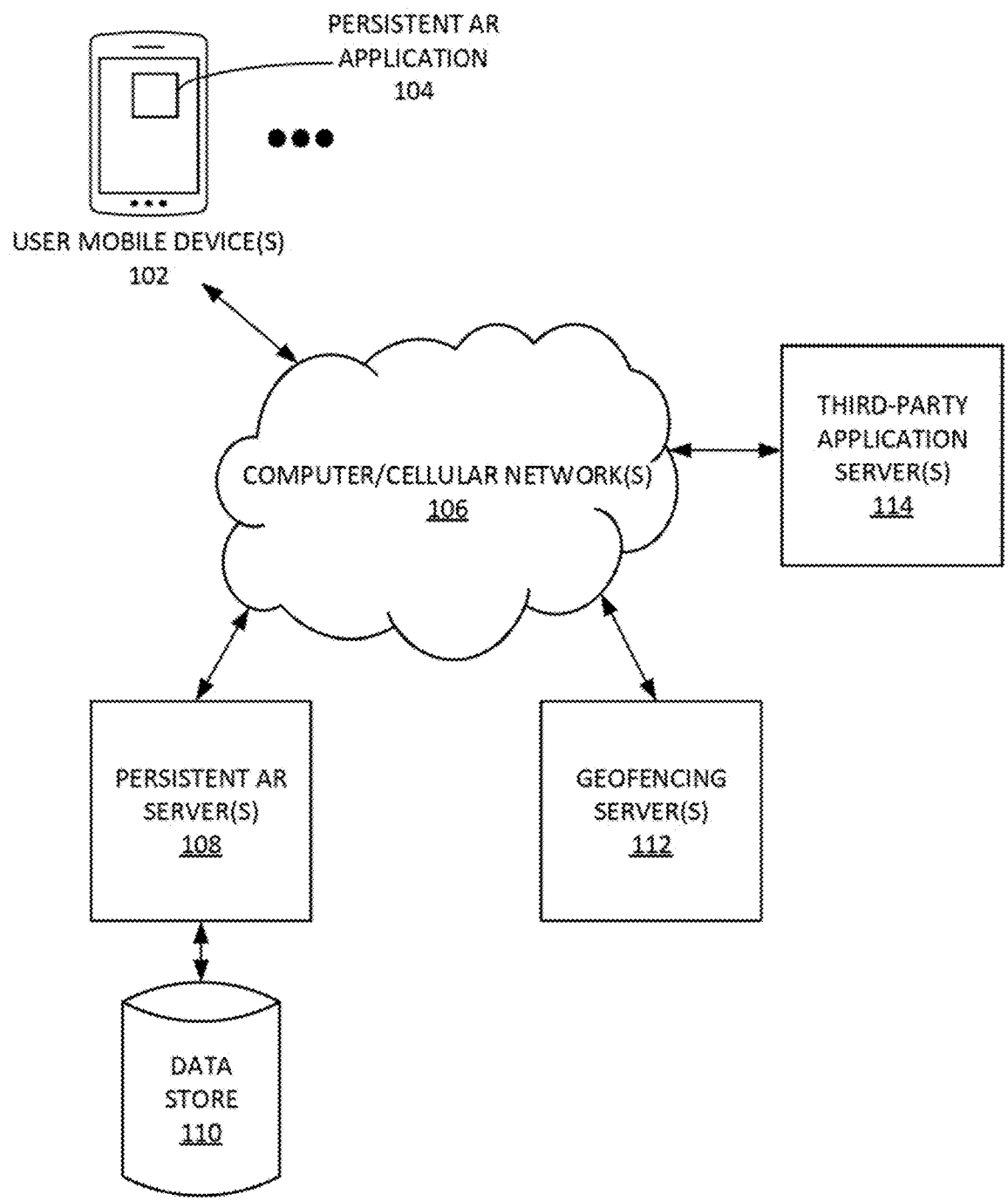
FIG. 1 illustrates an example persistent augmented reality (AR) system, according to some embodiments.

The Figures described above are a representative set, and are not an exhaustive with respect to embodying the invention.

DESCRIPTION

Disclosed are a system, method, and article of manufacture of persistent geo-located augmented reality social network system and method. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Augmented reality Augmented reality (AR) is a live direct or indirect view of a physical, real-world environment whose elements are augmented by computer-generated or extracted real-world sensory input such as sound, video, graphics or GPS data. User can interact with AR objects via a mobile-device input system such as a touchscreen, microphone and the like.

Dunbar's number refers to a suggested cognitive limit to the number of people with whom one can maintain stable social relationships. For example, a relationship can be defined such that the individual knows who each person is and how each person relates to every other person.

Geolocation refers to the identification or estimation of the real-world geographic location of an object, such as a radar source, mobile phone, or Internet-connected computer terminal. In one example, geolocation techniques can be used to determine a set of geographic coordinates (e.g. using a positioning system such as GPS and the like). In another example, geolocation can be enhanced by the use of these coordinates to determine a meaningful location, such as a street address.

Mobile devices can refer to a computing device small enough to hold and operate in the hand such as smartphones, tablet computers, head-mounted displays, etc.

Social network is a social structure made up of a set of social actors (such as individuals or organizations), sets of dyadic ties, and other social interactions between actors. Social actors can share geolocated persistent AR objects and/or related content with a social network context.

Example Systems

FIG. 1 illustrates an example persistent augmented reality (AR) system 100, according to some embodiments. Persistent AR system 100 can enable mobile device users (e.g. smartphone, tablet computer, AR enabled glasses with GPS capability, etc.) to place persistent AR objects persistently in the real world. Shareable geolocated persistent AR objects can be shared within the geolocated persistent AR object online social network. Shareable geolocated persistent AR objects can have the logic and multimedia capabilities of any software application. Shareable geolocated persistent AR objects can be programmable with three-dimensional (3D) and/or two-dimensional (2D) graphics, animation, video, and spatialized audio.

The entities of system 100 can be server systems and/or other computer-implemented functionalities. These entities can communicate via computer network(s) 104. Computer network(s) 104 can include, inter alia: the Internet, enterprise private networks, local area networks, cellular networks, etc.

User mobile devices 102 can include a display system and a persistent AR application 104. Persistent AR application 104 can be a geolocated persistent AR object master application used to place other AR-based applications as shareable geolocated persistent AR objects that are accessible via a persistent AR online social network. Persistent AR application 104 can be used to develop shareable geolocated persistent AR objects. For example, a user can utilize persistent AR application 104 to, inter alia: convert existing applications to a geolocated persistent AR object-based application, develop various shareable geolocated persistent AR objects from scratch, modify shareable geolocated persistent AR objects, geolocate shareable geolocated persistent AR objects, etc. Persistent AR application 104 can be used to subscribe to the persistent AR channels of other users. Persistent AR application 104 can be used to view and/or otherwise interact with shareable geolocated persistent AR objects.

Persistent AR application 104 can access various persistent AR development tools in persistent AR server(s) 106. Persistent AR server(s) 106 include functionalities for developing shareable geolocated persistent AR objects. Persistent AR server(s) 106 can include various process, such processes such as 500 and 700 infra. Persistent AR server(s) 106 can implement systems 200, 300, etc. as provided infra. Persistent AR server(s) 106 can include various other tools/systems such as, inter alia: web servers, email servers, text messaging servers, database managers, dashboard managers, geolocation servers, web mapping services, APIs, SDKs, online social network servers, etc.

Persistent AR application 104 can manage a geolocated persistent AR object-based online social network. The geolocated persistent AR object-based online social network enable users to connect and share shareable geolocated persistent AR objects. In one example, a geolocated persistent AR object can be independent AR applications which must be created using the geolocated persistent AR object software development kit (SDK). Instances of such shareable geolocated persistent AR objects can be placed by users in a shared AR world provided by a shareable geolocated persistent AR objects master application of the geolocated persistent AR object online network.

The geolocated persistent AR object master application provides a searchable list of available shareable geolocated persistent AR objects. Upon selection from the list an instance of the geolocated persistent AR object is created within the geolocated persistent AR object master application at the user's current location and becomes selected. The geolocated persistent AR object master application provides a placement tool with controls to translate and rotate the selected object in three dimensions, allowing the user to place the geolocated persistent AR object in any location and pose as desired. Controls are also provided to save a geolocated persistent AR object or to delete it as well as undo and redo. Shareable geolocated persistent AR objects may later be selected via the touch screen of the mobile device (or by other appropriate mechanism depending on the hardware). Once selected (by the owner), a geolocated persistent AR object's position and orientation may be adjusted and saved with the placement tool. The selected geolocated persistent AR object may optionally provide a geolocated persistent AR object-specific heads-up-display (HUD) with an input user interface for its specific configuration which is displayed within the geolocated persistent AR object master application. A lightweight storage mechanism is provided by the system to all shareable geolocated persistent AR objects which may be used to store such information persistently. Alternatively, the geolocated persistent AR object may use and access its own server over the web for such purpose. Shareable geolocated persistent AR objects may also include a HUD for use by end users which is made accessible within the geolocated persistent AR object. In addition, it's possible to create HUD-based apps which are not associated with real world locations, instead being always available similar to traditional apps. Such HUD extensions however may also dynamically create, alter, and/or remove world oriented content as the user moves through the world.

Figure 2:
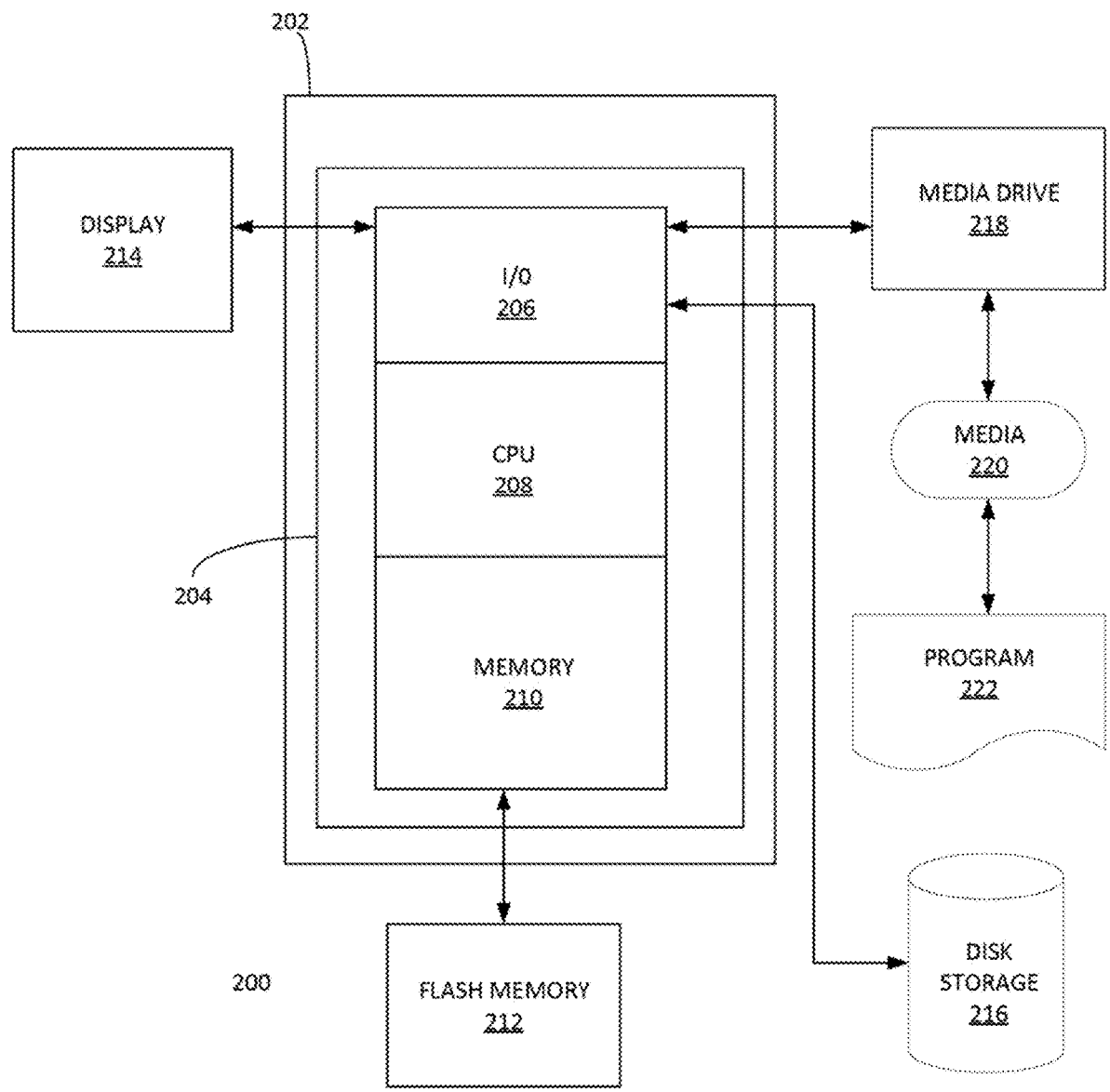
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
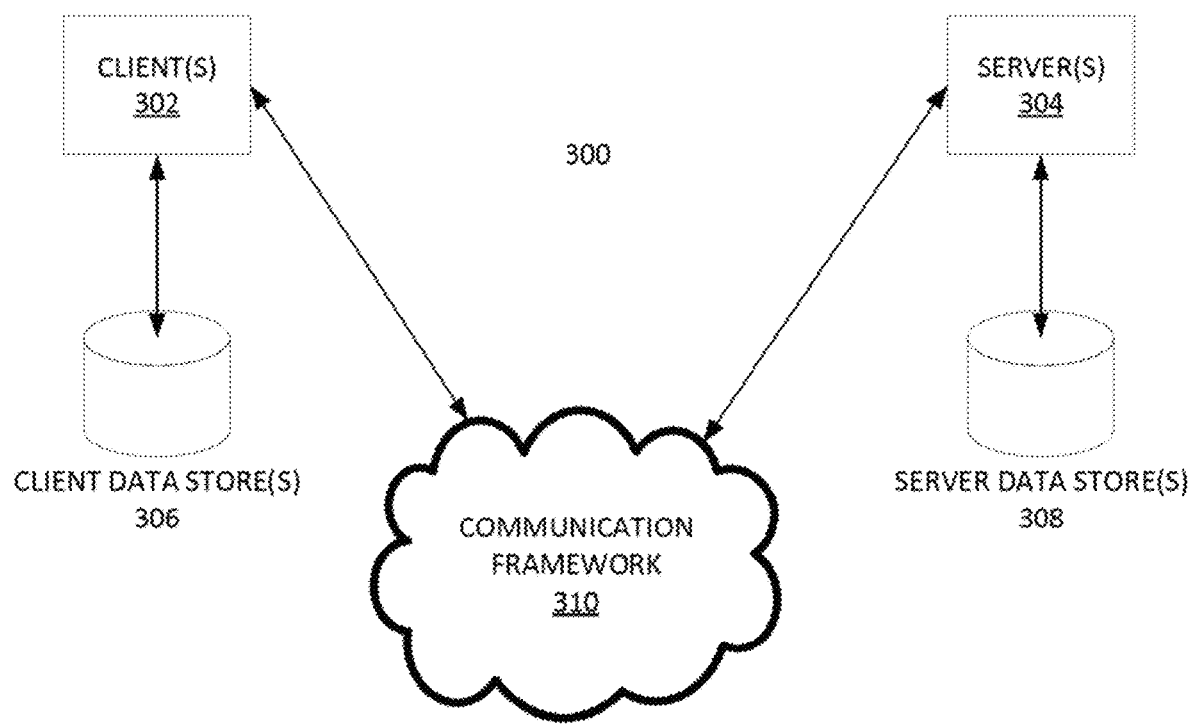
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Figure 4:
FIG. 4 illustrates an example set of mobile-device screen shots including shareable geolocated persistent AR objects, according to some embodiments.

FIG. 4 illustrates an example set of mobile-device screen shots including Shareable geolocated persistent AR objects, according to some embodiments. As shown, shareable geolocated persistent AR objects, can be accessible via a mobile-device display. Shareable geolocated persistent AR objects can represent a plurality of designs and mobile-device application functionality.

Example Methods and Processes

Figure 5:
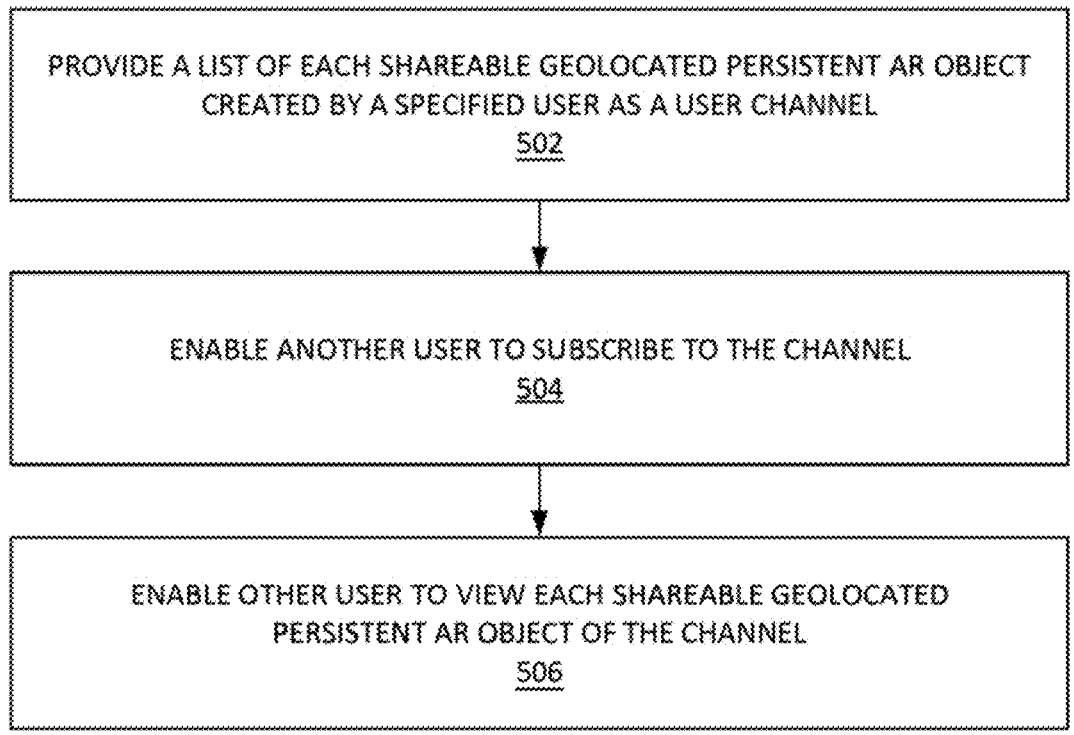
FIG. 5 illustrates an example process for sharing shareable geolocated persistent AR objects between users, according to some embodiments.

FIG. 5 illustrates an example process 500 for sharing shareable geolocated persistent AR objects between users, according to some embodiments. In step 502, process 500 can provide a list of each geolocated persistent AR object created by a specified user as a user channel. In step 504, process 500 can enable another user to subscribe to the channel. In step 506, process 500 can enable the other user to view each geolocated persistent AR object of the channel.

For example, for each registered user, a record of user's shareable geolocated persistent AR objects created by the user can be maintained and stored. This can be abstracted as the user's persistent AR channel. The channel can include the geolocation of the various shareable geolocated persistent AR objects.

Another user may subscribe to a user's channel. Accordingly, the shareable geolocated persistent AR objects placed by the owner of the channel will also become visible to that user. The user may later unsubscribe from the channel. In which case, all the shareable geolocated persistent AR objects associated with the channel then become unavailable.

A searchable list of all channels is provided. Each element of the list can have a control option to subscribe to the associated channel. For a given user, a list of that user's current subscriptions is provided, each element of the list providing a control to unsubscribe and also a control to temporarily hide the channel's shareable geolocated persistent AR objects. In this way, shareable geolocated persistent AR objects can be shared between users.

A geolocated persistent AR object online network can implement process 500 to enable users to share their shareable geolocated persistent AR objects. The geolocated persistent AR object online network can have various rules. In one example, only registered users have channels that may be subscribed to. Unregistered users (e.g. guest users) may subscribe to other channels and create shareable geolocated persistent AR objects (like registered users). However, these shareable geolocated persistent AR objects can be visible to that the particular mobile-device AR application of the guest. Should the guest user decide to sign up, his/her channel can become visible to other users. Accordingly, shareable geolocated persistent AR objects previously created as a guest user can be made available on the entire geolocated persistent AR object online network (e.g. via channel subscription methods, etc.).

Figure 6:
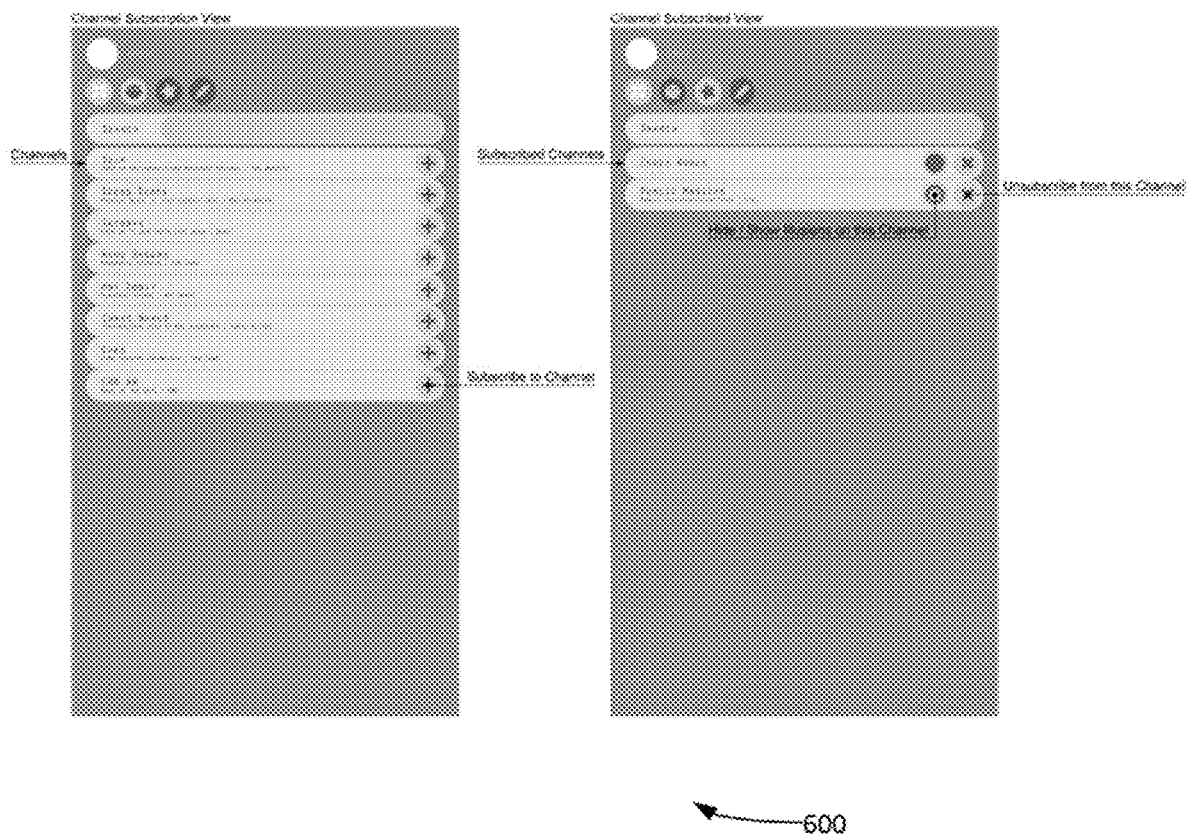
FIG. 6 illustrates an example geolocated persistent AR object mobile-device application display, according to some embodiments.

FIG. 6 illustrates an example geolocated persistent AR object mobile-device application display 600, according to some embodiments. Display 600 illustrates a first view various example channels a user can subscribed to as a result of a channel search. Display 600 also shows a second view of channels a user has subscribed to. Various control button is provided whereby a user can: subscribe to a particular channel, unsubscribe from a particular channel, view shareable geolocated persistent AR objects of a particular channel, implement a channel and/or geolocated persistent AR object search, etc.

Figure 7:
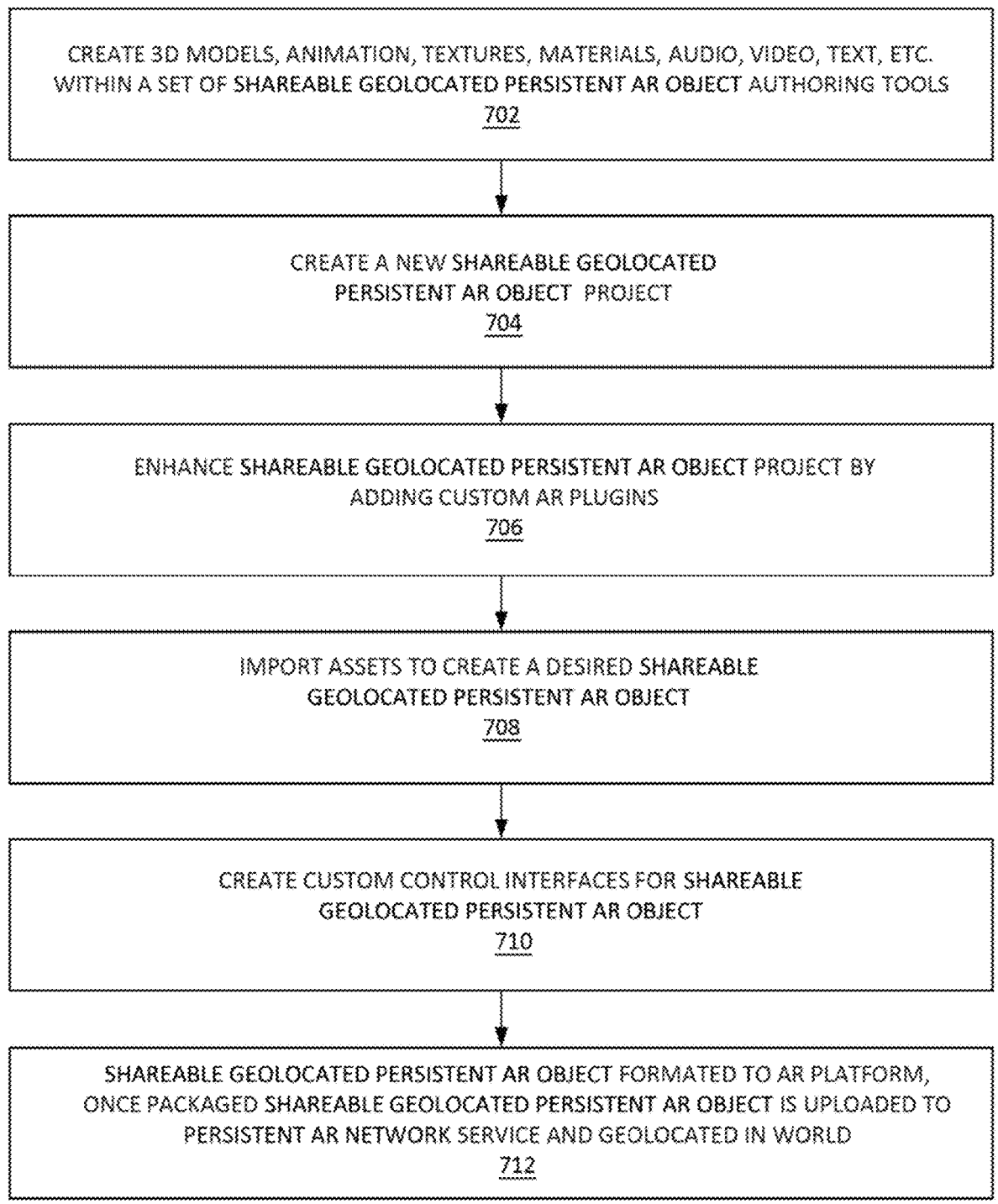
FIG. 7 illustrates an example method of generating shareable geolocated persistent AR objects, according to some embodiments.

FIG. 7 illustrates an example method of generating shareable geolocated persistent AR objects, according to some embodiments. In step 702, process 700 can create 3D models, animation, textures, materials, audio, video, text, etc. within a set of geolocated persistent AR object authoring tools. In step 704, process 700 can create a new geolocated persistent AR object project. In step 706, process 700 can enhance geolocated persistent AR object project by adding custom AR plugins. In step 708, process 700 can import assets to create a desired geolocated persistent AR object. In step 710, process 700 can create custom control interfaces for geolocated persistent AR object. In step 712, process 700 can geolocated persistent AR object packaged to format of a desired AR platform, once packaged geolocated persistent AR object is uploaded to the persistent AR network service and geolocated in the world.

Figure 8:
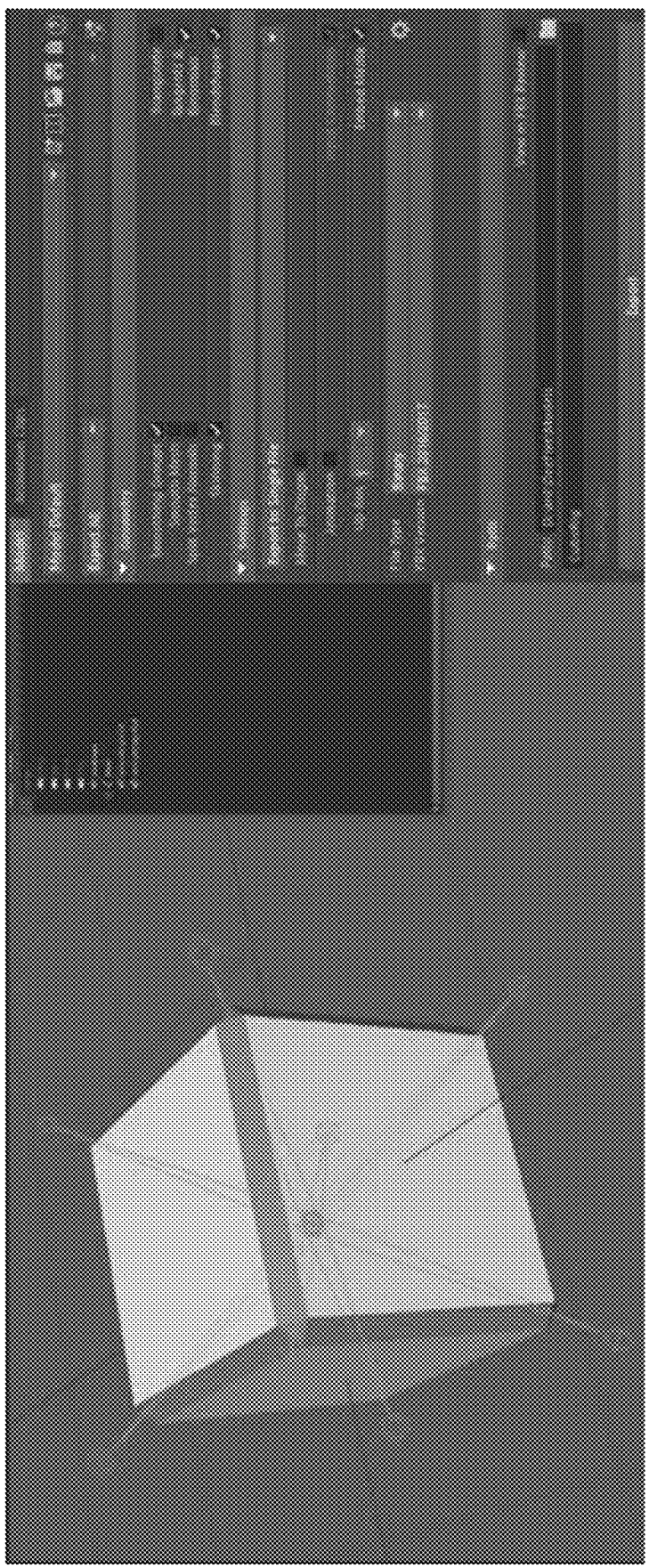
FIGS. 8-16 illustrate example screen shots with information that can be used to implement process 700, according to some embodiments.
Figure 9:
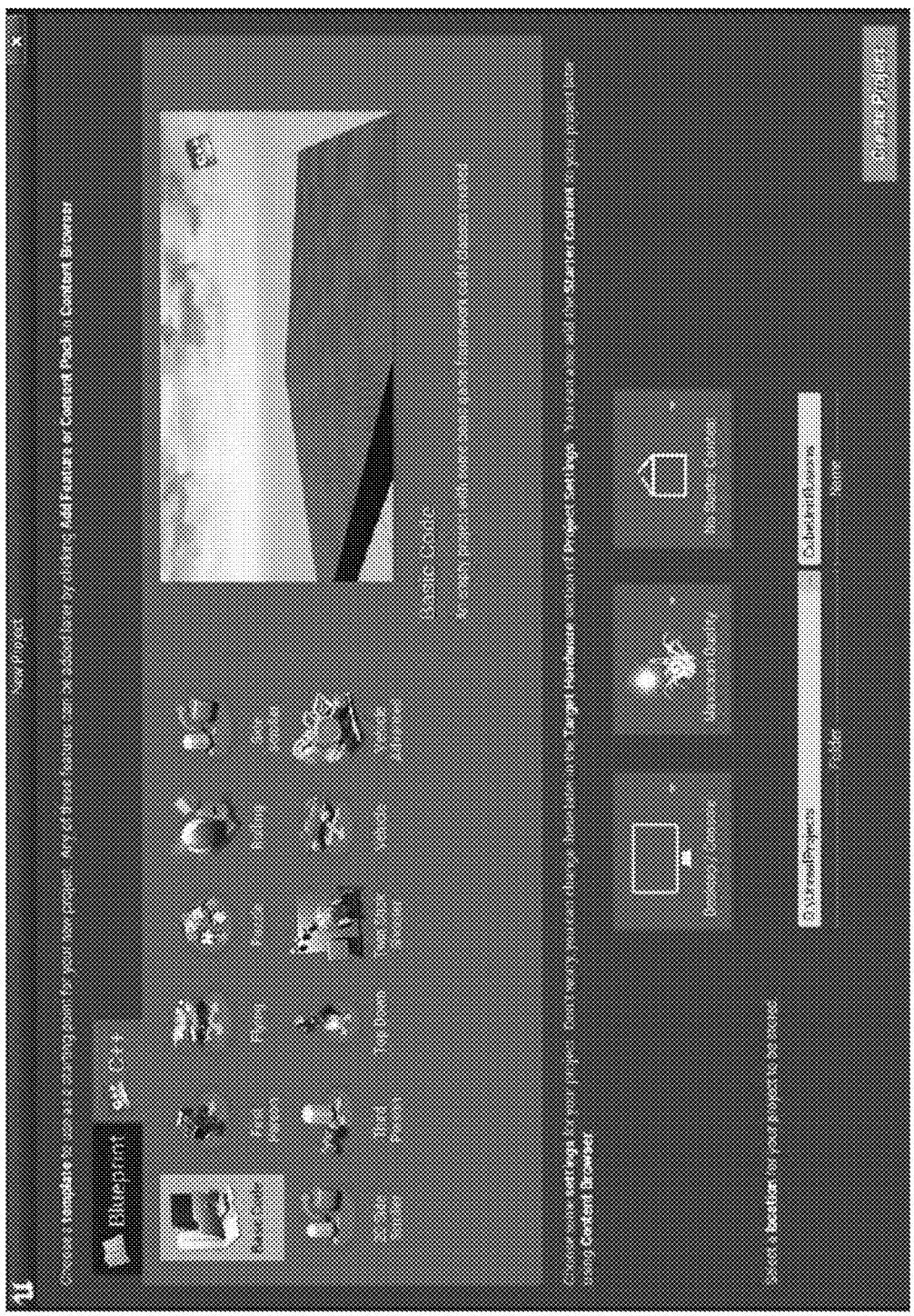
Figure 10:
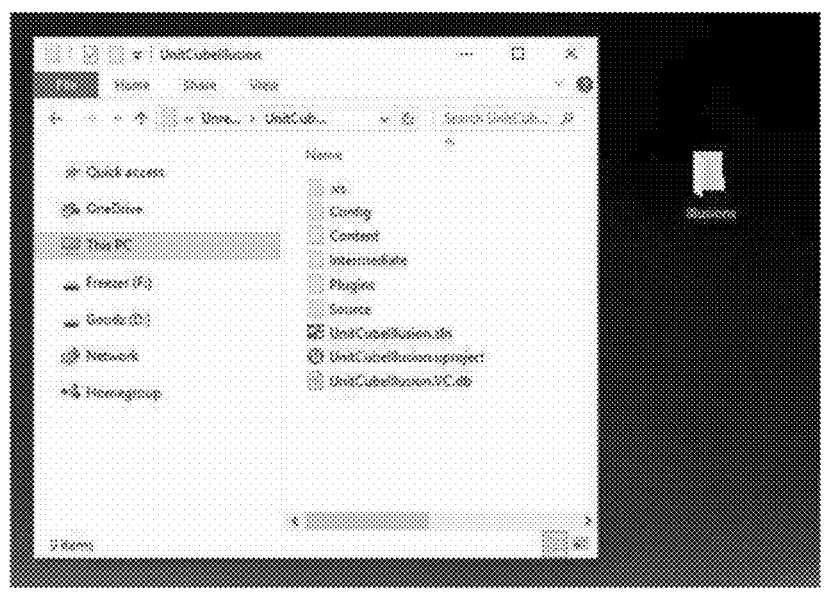
Figure 11:
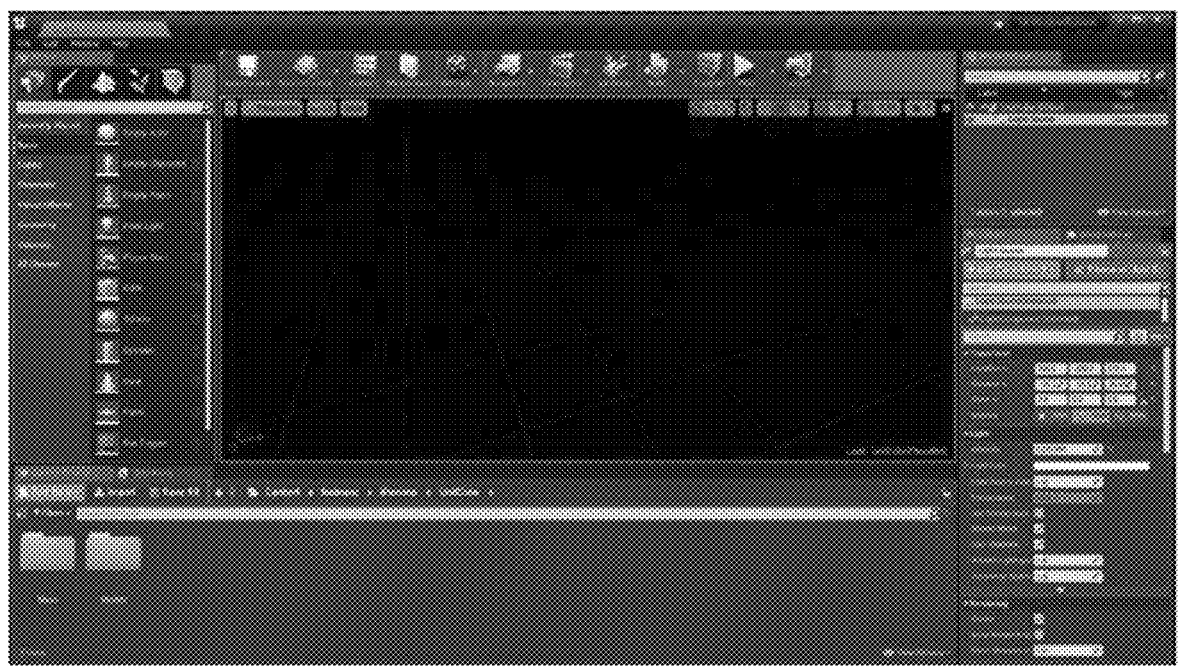
Figure 12:
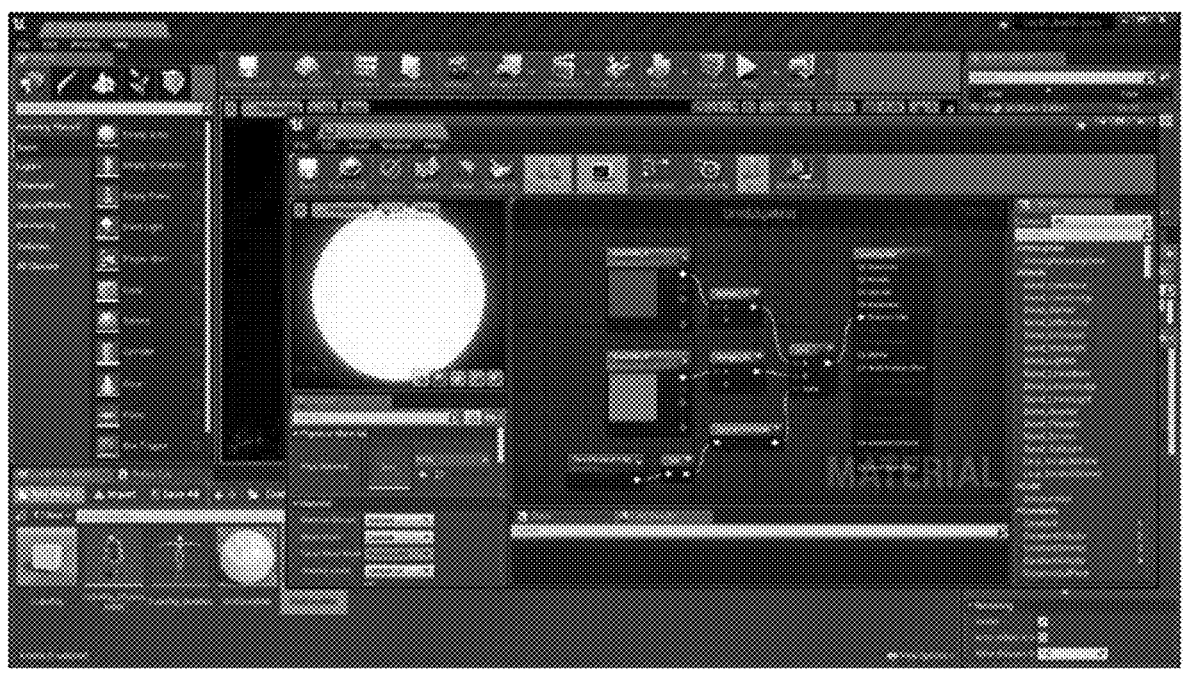
Figure 13:
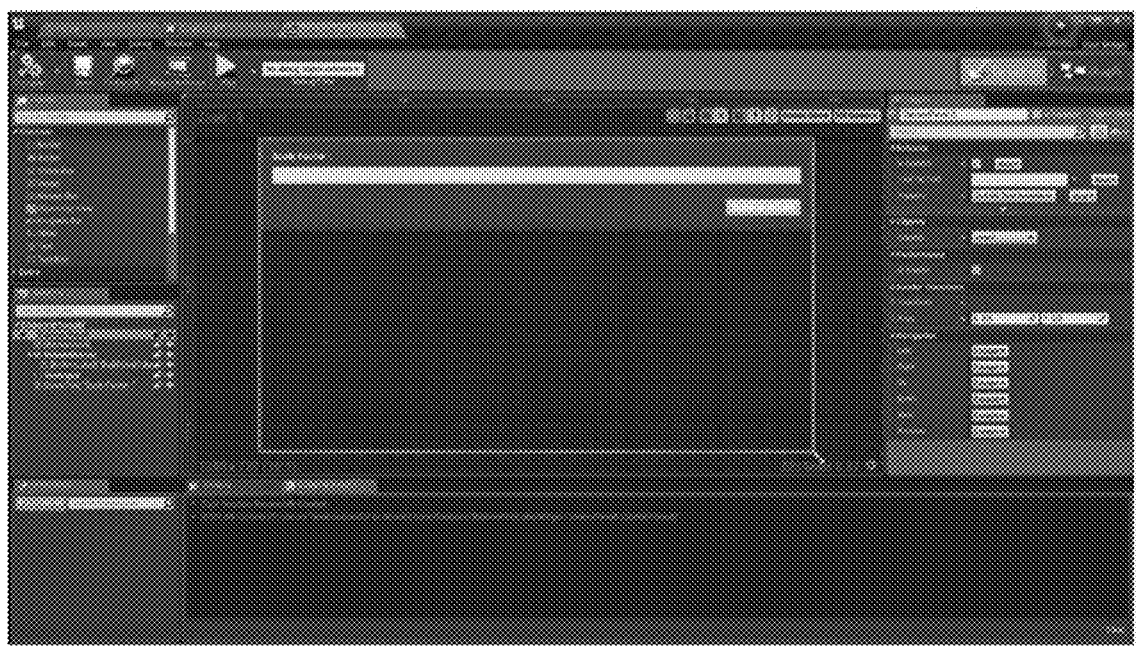
Figure 14:
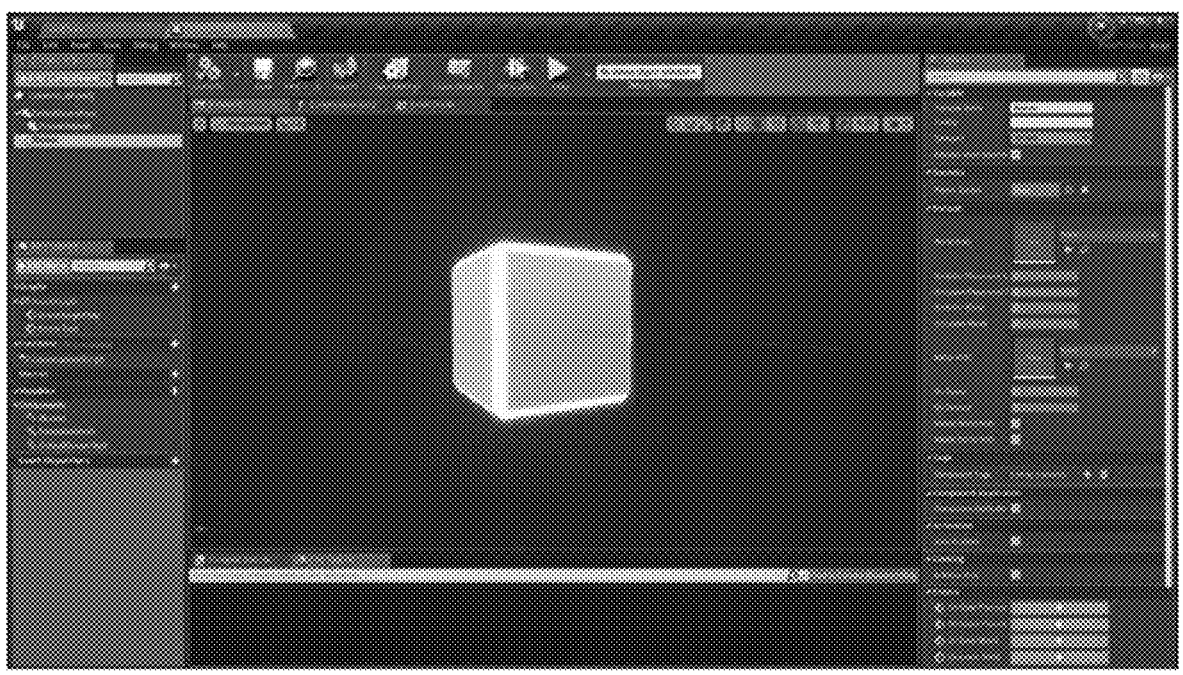
Figure 15:
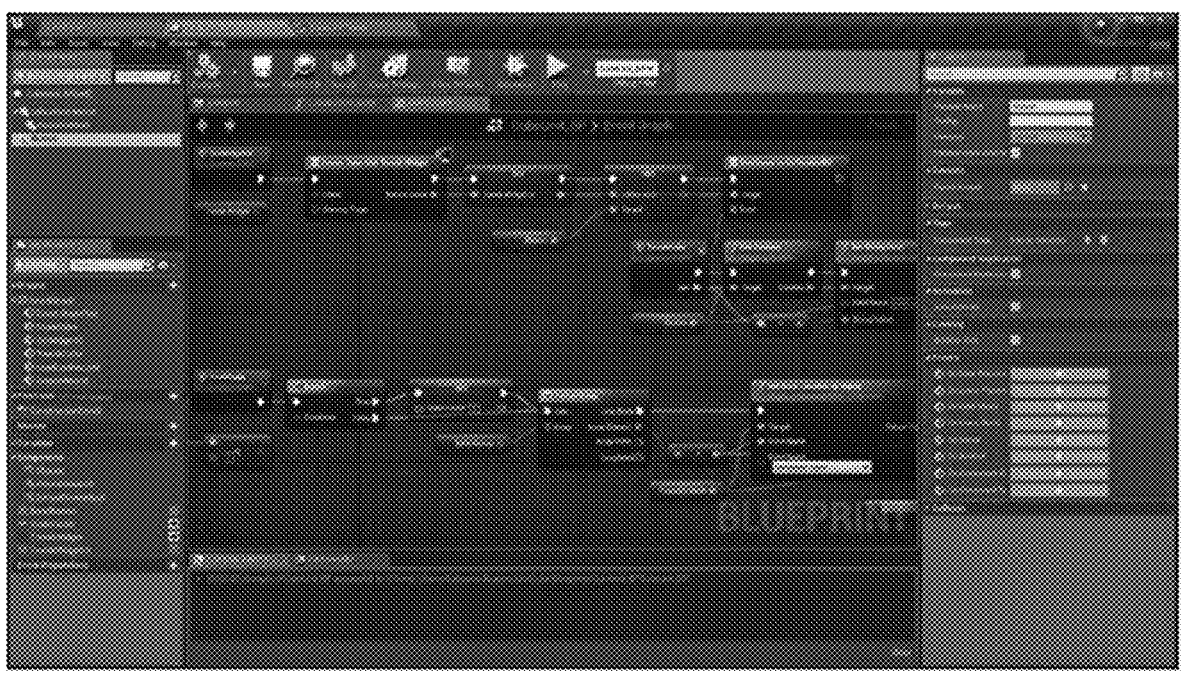
Figure 16:
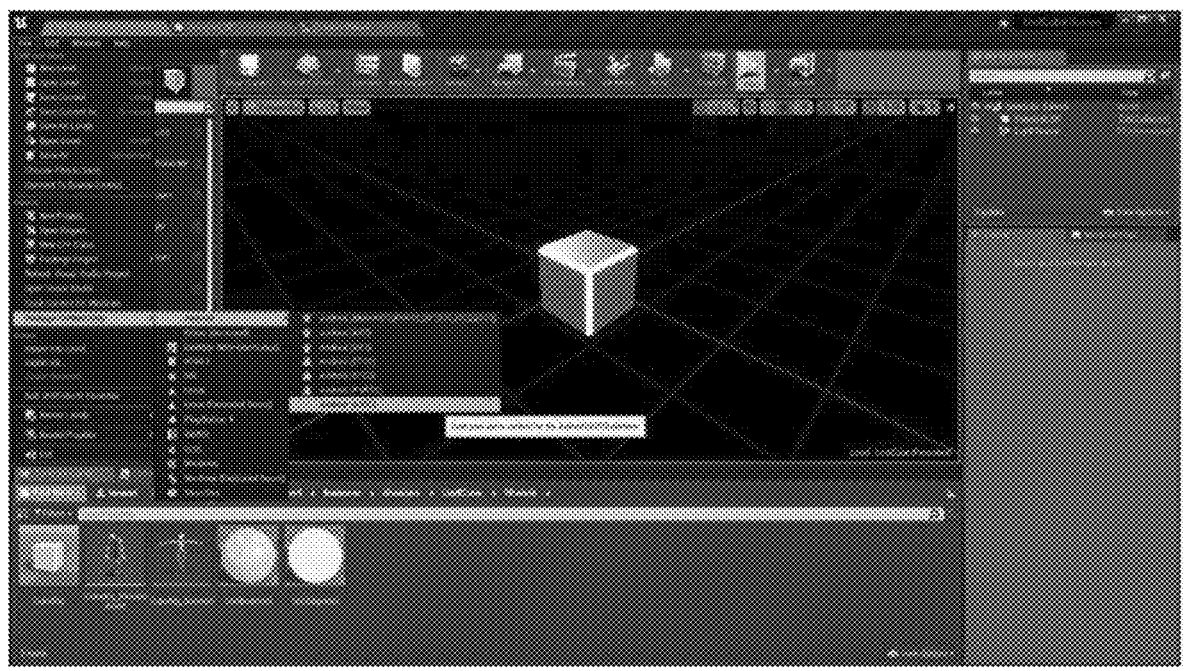

FIGS. 8-16 illustrate example screen shots with information that can be used to implement process 700, according to some embodiments. More specifically, FIG. 8 illustrates a dashboard used to create 3D models, animation, textures, materials, audio, video, text, etc. within your preferred authoring tools. A user can export/convert assets to various supported file formats. FIG. 9 illustrates a dashboard used to create a new geolocated persistent AR object creation project. FIG. 10 illustrates a method to enhance geolocated persistent AR object by adding the custom plugins. FIG. 11 illustrates an empty project view. FIG. 12 illustrates a dashboard view for importing various assets so to create a geolocated persistent AR object. FIG. 13 illustrates various custom control interfaces for geolocated persistent AR object creation. FIG. 14 illustrates a dashboard view for attaching a geolocated persistent AR object component to a geolocated persistent AR object blueprint. Geolocated persistent AR object functionality is also exposed for modification/addition. FIG. 15 illustrates geolocated persistent AR object as maps within a geolocated persistent AR object engine, supporting a full range functionality and features. FIG. 16 illustrates the packaging a geolocated persistent AR object targeting a desired platform. Once the geolocated persistent AR object is packaged, it can be uploaded to a selected geolocated persistent AR object service and geolocated in the world.

Figure 17:
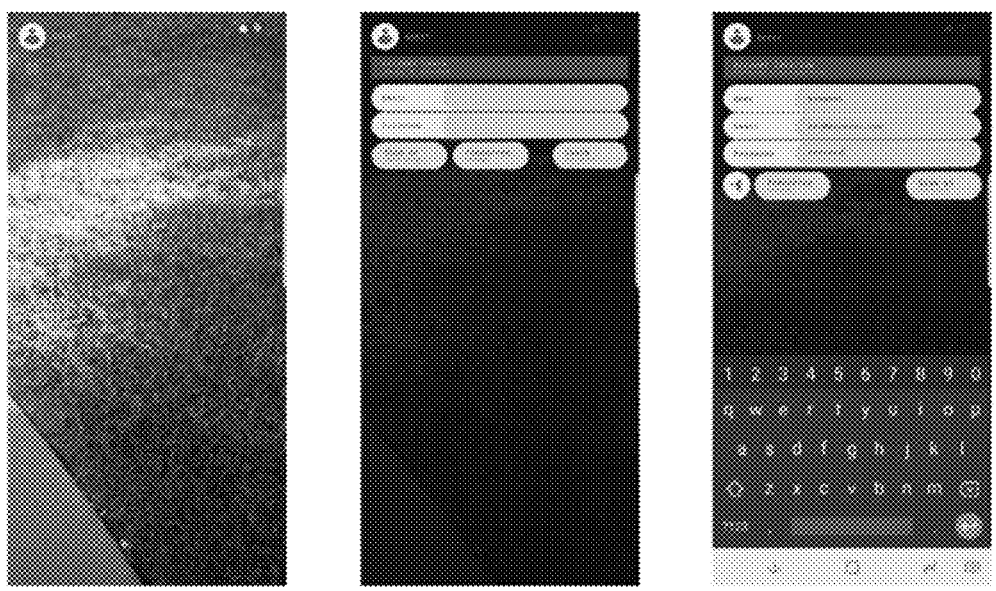
FIG. 17 illustrates a set of screen shots showing geolocating shareable geolocated persistent AR objects, according to some embodiments.

FIG. 17 illustrates a set of screen shots showing geolocating shareable geolocated persistent AR objects, according to some embodiments. A geolocated persistent AR object application can be launched in the user's mobile device. A persistent AR network guest can place shareable geolocated persistent AR objects in any physical location (e.g. as mapped by a geolocation service, etc.). Guest shareable geolocated persistent AR object cannot be viewed by others on the persistent AR online social network. Creating a persistent AR account transfers the guest's shareable geolocated persistent AR objects into a discoverable channel (e.g. see above) on the persistent AR online social network.

Figure 18:
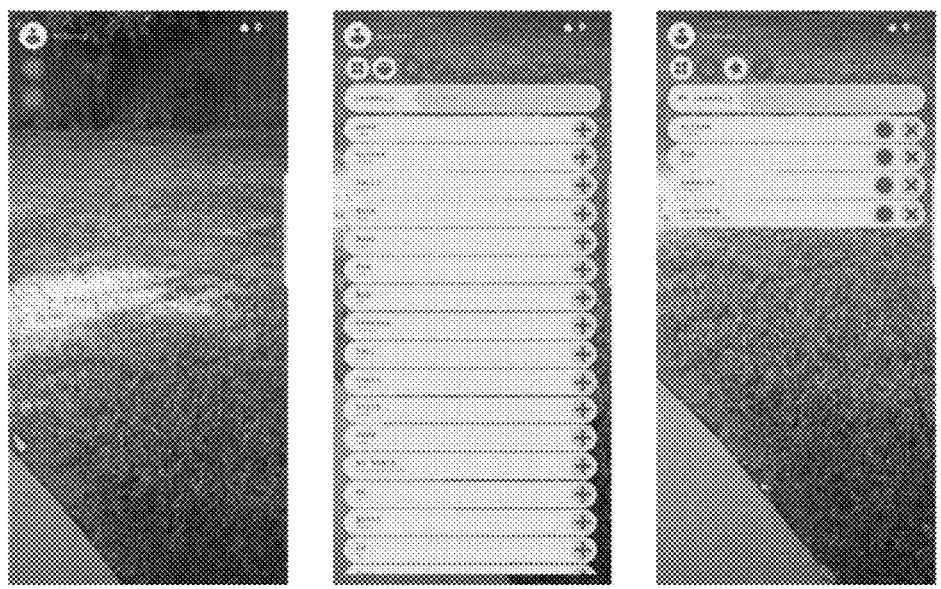
FIG. 18 illustrates a set of screen shots showing various geolocated persistent AR object application controls, according to some embodiments.

FIG. 18 illustrates a set of screen shots showing various persistent AR application controls, according to some embodiments. Users can use these controls to join, hide, show and leave persistent AR channels.

Figure 19:
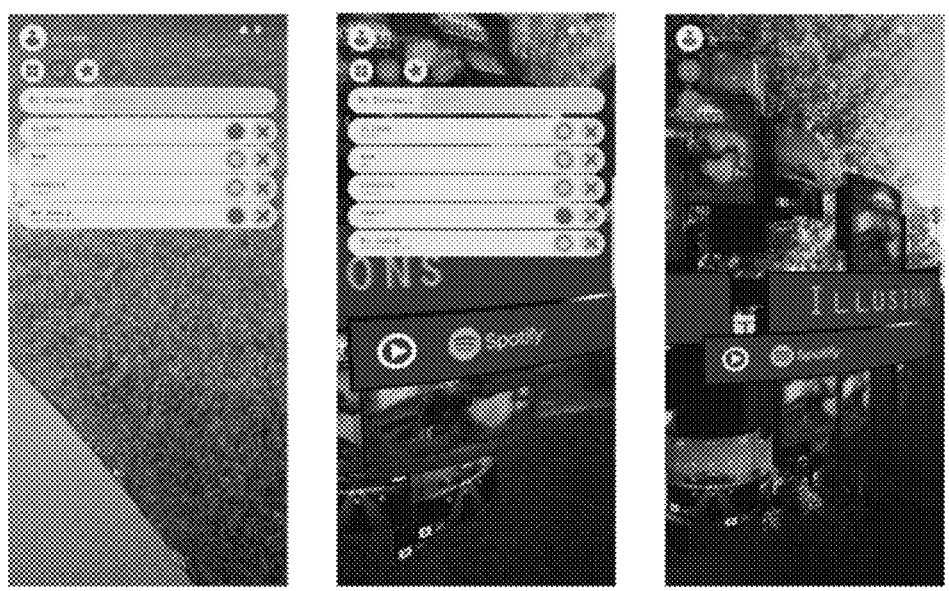
FIG. 19 illustrates a set of screen shots showing a user placing shareable geolocated persistent AR objects in a channel for viewing by channel subscribers, according to some embodiments.

FIG. 19 illustrates a set of screen shots showing a user placing shareable geolocated persistent AR objects in a channel for viewing by channel subscribers, according to some embodiments. Shareable geolocated persistent AR object placed within a persistent AR channel can become available to all users viewing that persistent AR channel.

Figure 20:
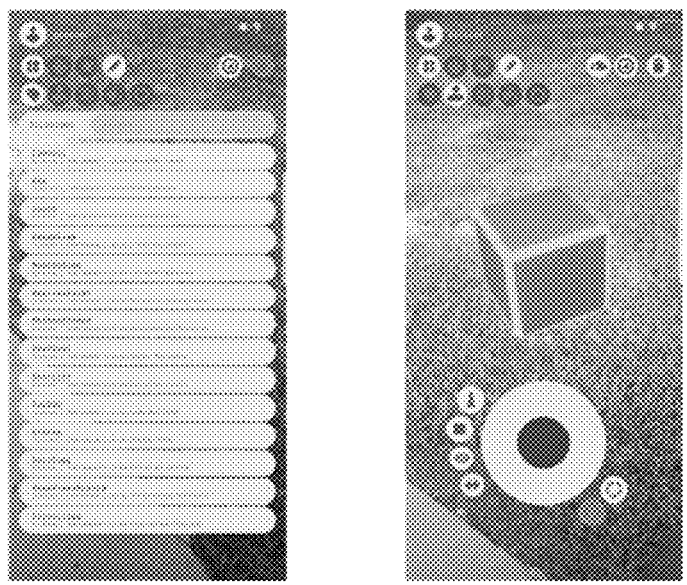
FIG. 20 illustrates a set of screen shots of a user interacting with a geolocated persistent AR object, according to some embodiments.

FIG. 20 illustrates a set of screen shots of a user interacting with a geolocated persistent AR object, according to some embodiments. Users can add geolocated persistent AR object to the world by selecting from a list of authored content. Once a geolocated persistent AR object is chosen, the selected geolocated persistent AR object can be manipulated/repositioned as desired.

Figure 21:
FIG. 21 illustrates a screen shot of a dashboard that enables a user to modify a geolocated persistent AR object, according to some embodiments.

FIG. 21 illustrates a screen shot of a dashboard that enables a user to modify a geolocated persistent AR object, according to some embodiments. User can modify/edit/extend an aspect of their geolocated persistent AR object. Once repackaged and uploaded, the modifications made to the geolocated persistent AR object can be automatically distributed via the geolocated persistent AR object online social network.

Figure 22:
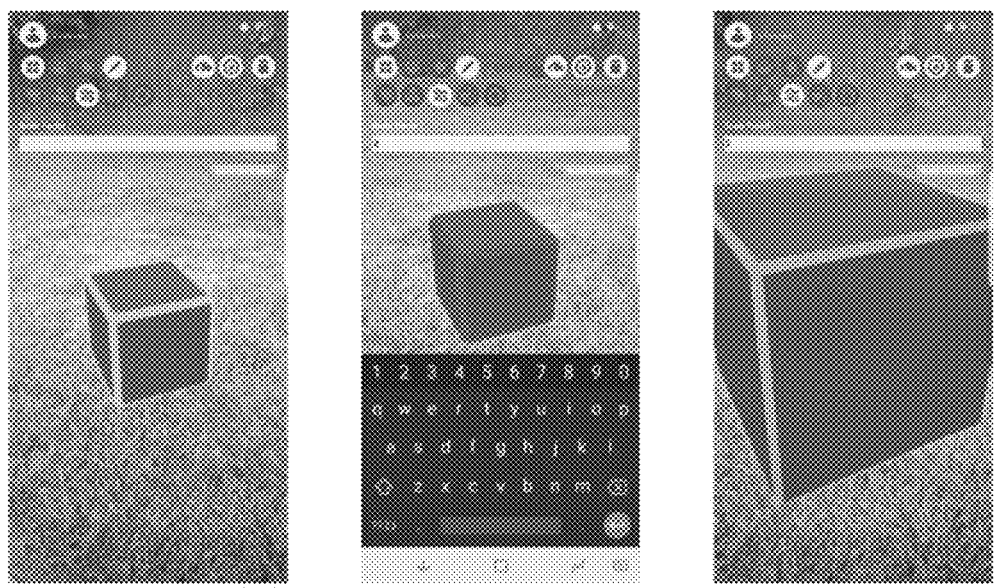
FIG. 22 illustrates a set of screen shots of a scaling a geolocated persistent AR object with mobile-device application, according to some embodiments.

FIG. 22 illustrates a set of screen shots of a scaling a geolocated persistent AR object with mobile-device application, according to some embodiments. Users can access custom controls that have been exposed by the geolocated persistent AR object creator. In the present example, the geolocated persistent AR object can be scaled in size for inspection and/or other interactions.

Figure 23:
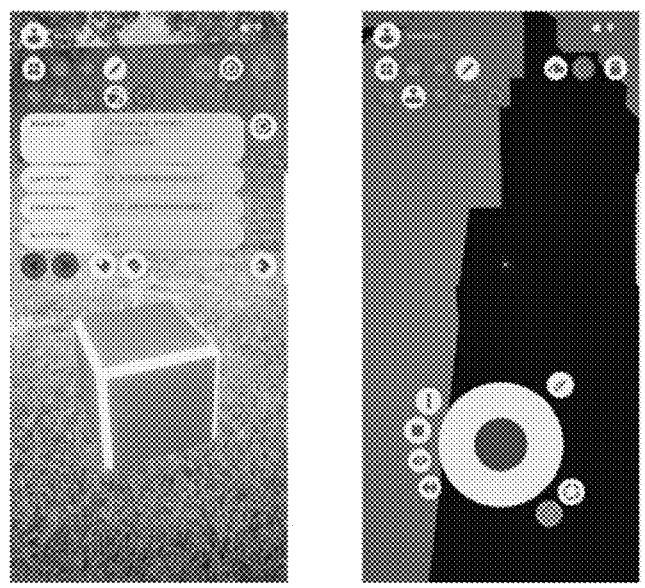
FIG. 23 illustrates a set of screen shots illustrating user teleportation in an AR environment, according to some embodiments.

FIG. 23 illustrates a set of screen shots illustrating user teleportation in an AR environment, according to some embodiments. Users also have the ability to 'teleport' anywhere in an AR environment. Teleport mode enables the editing and placing of shareable geolocated persistent AR objects without the need to physically be at the remote location. When the device passthrough (real-world) camera on a mobile phone/table is enabled, as is required in AR, the virtual world camera orientation is linked to it and the location of virtual world camera is associated with the device's GPS location. However, persistent AR application provides controls to turn off the real-world camera and in that case the virtual camera may be manually controlled (in terms of position and orientation). A 3D geographical virtual map is provided when the real-world camera is off, along with an address search input control which allows the user to "teleport" to any geographical location (with all geolocated persistent AR object at that location remaining visible). Users may use this mechanism to view and/or place geolocated persistent AR object at remote locations.

Figure 24:
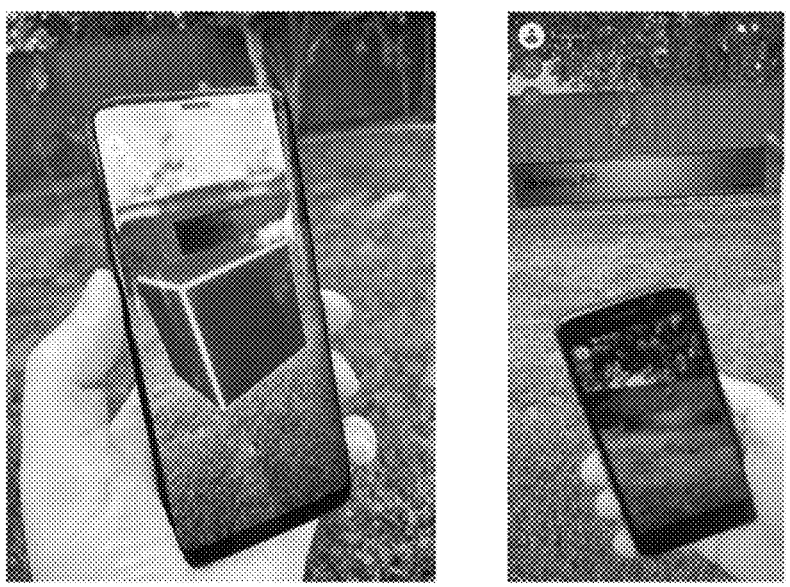
FIG. 24 illustrates a set of screen shots of a view of a geolocated persistent AR object, according to some embodiments.

FIG. 24 illustrates a set of screen shots of a view of a geolocated persistent AR object, according to some embodiments. Geolocated persistent AR object can be viewed at the same time by multiple users within the geolocated persistent AR object online social network.

An example billing method is now provided. It is noted that users with a specified number of subscribers (e.g. less than two-hundred and fifty (250) subscribers and/or other number based on an upper limit of Dunbar's number) may place any number of shareable geolocated persistent AR objects at any location in the world without restriction or cost. Users with more than the specified number of subscribers can be charged: each time a geolocated persistent AR object that has been placed on that user's channel is loaded into a device; each time such a geolocated persistent AR object is selected on a mobile device; each time such a geolocated persistent AR object launches an external application; etc. The owner of a channel pays the minimum cost for shareable geolocated persistent AR objects placed on the owner's own channel (note the minimum price may vary depending on time and location). However, a channel owner may opt to allow other users to place shareable geolocated persistent AR objects on his/her channel. In that case, other users can bid for access to the channel at a specific real-world location during a real-world time interval. In this case, the loading or selecting of a geolocated persistent AR object may not be charged to the channel owner but rather to the user with the winning bid, and the channel owner will receive a percentage of the of the charge as payment for the use of the channel. The auction controls can be part of an in-application and/or web-based tool. This can include a geographical map subdivided into available locations, a calendar of available times, and a list of channels available for placement. The current highest bid can be displayed (and/or the minimum if none has been made) for a given selection, and controls are provided for the user to offer and commit a higher bid.

For paying users a billing statement is provided with counts of geolocated persistent AR object loads and selections and external application launches for all such geolocated persistent AR object placed by the user or on the user's behalf together with the time, location, and channel of such occurrences.

CONCLUSION

Although the present embodiments have been described with reference to specific example embodiments, various modifications and changes can be made to these embodiments without departing from the broader spirit and scope of the various embodiments. For example, the various mobile devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method useful for generating shareable geolocated persistent augmented-reality (AR) objects comprising:
    providing a geolocated persistent AR object content within a set of geolocated persistent AR object authoring tools;
    creating a geolocated persistent AR object project;
    creating a geolocated persistent AR object in the geolocated persistent AR object project;
    enhancing a geolocated persistent AR object project by adding custom AR plugins to the geolocated persistent AR object;
    importing assets to the geolocated persistent AR object;
    adding a custom control interface for the geolocated persistent AR object;
    geolocating the persistent AR object to format of a specified AR platform; and
    once packaged, uploading the geolocated persistent AR object to a persistent AR network service of a different specified AR platform.

2. The computerized method of claim 1, wherein the geolocated persistent AR object comprises a three-dimensional (3D) model, an animation, a texture type, a digital material type, an audio content, a video content, or a text content.

3. A computerized method useful for generating shareable geolocated persistent augmented-reality (AR) objects comprising:
    providing a geolocated persistent AR object content within a set of geolocated persistent AR object authoring tools;
    creating a geolocated persistent AR object project;
    creating a geolocated persistent AR object in the geolocated persistent AR object project;
    enhancing a geolocated persistent AR object project by adding custom AR plugins to the geolocated persistent AR object;
    importing assets to the geolocated persistent AR object;
    adding a custom control interface for the geolocated persistent AR object;
    geolocating the persistent AR object to format of a specified AR platform; and
    once packaged, uploading the geolocated persistent AR object to a persistent AR network service of a different specified AR platform, wherein the geolocated persistent AR object comprises a three-dimensional (3D) model, an animation, a texture type, a digital material type, an audio content, a video content, or a text content.

* * * * *